United States Patent
Gao et al.

(10) Patent No.: US 9,256,108 B2
(45) Date of Patent: Feb. 9, 2016

(54) DARK SPOT REPAIR METHOD OF LIQUID CRYSTAL PANEL AND LIQUID CRYSTAL PANEL

(71) Applicant: Shenzhen China Star Optoelectronics Technology Co., Ltd., Shenzhen, Guangdong (CN)

(72) Inventors: Dongzi Gao, Shenzhen (CN); Mei Xiong, Shenzhen (CN); Zhicheng Liu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 334 days.

(21) Appl. No.: 13/985,902
(22) PCT Filed: Jun. 26, 2013
(86) PCT No.: PCT/CN2013/078081
§ 371 (c)(1),
(2) Date: Aug. 16, 2013
(87) PCT Pub. No.: WO2014/180042
PCT Pub. Date: Nov. 13, 2014

(65) Prior Publication Data
US 2014/0327854 A1 Nov. 6, 2014

(30) Foreign Application Priority Data
May 6, 2013 (CN) .......................... 2013 1 0163314

(51) Int. Cl.
G02F 1/1362 (2006.01)
(52) U.S. Cl.
CPC ...... *G02F 1/136259* (2013.01); *G02F 1/13624* (2013.01); *G02F 2001/136268* (2013.01)
(58) Field of Classification Search
CPC ................ G02F 2001/136268; G02F 1/13624; G02F 1/136259
See application file for complete search history.

(56) References Cited

U.S. PATENT DOCUMENTS

| 5,132,819 A * | 7/1992 | Noriyama ........... G02F 1/13624 349/144 |
| 6,259,424 B1 * | 7/2001 | Kurogane ........... G02F 1/13624 345/87 |
| 7,990,356 B2 * | 8/2011 | Chung ................. G09G 3/3648 345/93 |

(Continued)

FOREIGN PATENT DOCUMENTS

CN 1987571 A 6/2007
CN 101144947 A 3/2008

(Continued)

*Primary Examiner* — Dennis Y Kim
(74) *Attorney, Agent, or Firm* — Andrew C. Cheng

(57) ABSTRACT

The present invention provides a dark spot repair method of a liquid crystal panel and a liquid crystal panel. The dark spot repair method includes (1) providing a liquid crystal panel, wherein the liquid crystal panel comprises a plurality of main pixels and the plurality of main pixels includes main pixels that have bright spot defects and are to be repaired, each of the main pixels being of a charge-share pixel structure, the main pixel comprising first and second voltage-division capacitors, which are connected in series, the first voltage-division capacitor comprising first and second metal layers that are opposite to each other, the second voltage-division capacitor comprising third and fourth metal layers that are opposite to each other; and (2) soldering and connecting together the first metal layer and the second metal layer of the first voltage-division capacitor and soldering and connecting the third metal layer and the fourth metal layer of the second voltage-division capacitor of each of the main pixels that have bright spot defects and are to be repaired so as to form electrical connections thereby repairing and making the main pixels to be repaired in a normally dark state. The method is simple in operation so as to save repair time, reduce repairing tools, increase throughput, and lower down manufacture cost.

2 Claims, 3 Drawing Sheets

(56) References Cited

U.S. PATENT DOCUMENTS 8,958,049 B2* 2/2015 Liu .................. G02F 1/136259
349/106
2006/0285029 A1* 12/2006 Yoo .................. G02F 1/136259
349/54

FOREIGN PATENT DOCUMENTS

| CN | 102591083 A | 7/2012 |
| CN | 102736341 A | 10/2012 |
| JP | 2009244527 A | 10/2009 |
| TW | I284221 B | 7/2007 |

* cited by examiner

1 providing a liquid crystal panel, wherein the liquid crystal panel comprises a plurality of main pixels and the plurality of main pixels includes main pixels that have bright spot defects and are to be repaired, each of the main pixels being of a charge-share pixel structure, the main pixel comprising first and second voltage-division capacitors, which are connected in series, the first voltage-division capacitor comprising first and second metal layers that are opposite to each other, the second voltage-division capacitor comprising third and fourth metal layers that are opposite to each other

2 soldering and connecting together the first metal layer and the second metal layer of the first voltage-division capacitor and soldering and connecting the third metal layer and the fourth metal layer of the second voltage-division capacitor of each of the main pixels that have bright spot defects and are to be repaired so as to form electrical connections thereby shorting each of the first voltage-division capacitor and the second voltage-division capacitor, and repairing and making the main pixels to be repaired in a normally dark state

Fig. 2

DARK SPOT REPAIR METHOD OF LIQUID CRYSTAL PANEL AND LIQUID CRYSTAL PANEL

BACKGROUND OF THE INVENTION

1. Field of the Invention

The present invention relates to the field of liquid crystal displaying, and in particular to a dark spot repair method of a liquid crystal panel and a liquid crystal panel.

2. The Related Arts

Liquid crystal displays have a variety of advantages, such as thin device body, low power consumption, and being free of radiation, and are thus widely used. Most of the liquid crystal displays that are currently available in the market are backlighting liquid crystal displays, which comprise a liquid crystal panel and a backlight module. The operation principle of the liquid crystal panel is that liquid crystal molecules are interposed between two parallel glass substrates and a driving voltage is applied to the two glass substrates to control rotation direction of the liquid crystal molecules in order to refract out light emitting from the backlight module for generating images. Since the liquid crystal panel itself does not emit light, light must be provided from the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

To enhance the quality of displaying in large view angles, in other words, to make colors displayed at an inclined view angle and a front view angle well consistent with each other, a liquid crystal panel is often comprised of a structure of pixel that adopts a so-called charge-share pixel structure. As shown in FIG. 1, the charge-share pixel structure generally divides a main pixel into two portions, namely a first sub-pixel 100 and a second sub-pixel 200, wherein the first sub-pixel 100 comprises a first thin-film transistor T100 connected to a first gate line and second sub-pixel 200 comprises a second thin-film transistor T200 connected to the first gate line and a third thin-film transistor T300 connected to the second thin-film transistor T200 and a second gate line. When the first thin-film transistor T100 and the second thin-film transistor T200 are simultaneously activated by a control signal applied to the first gate line, a liquid crystal capacitor $C_{lc100}$ of the first sub-pixel 100 and a liquid crystal capacitor $C_{lc200}$ of the second sub-pixel 200 show the same grey level voltage. Subsequently, when the third thin-film transistor T300 is activated by a control signal applied to the second gate line, since the liquid crystal capacitor $C_{lc100}$ shares charges with voltage-division capacitors $C_{cs100}$, $C_{cs200}$, the liquid crystal capacitor $C_{lc100}$ of the first sub-pixel 100 would have a different grey level voltage from the liquid crystal capacitor $C_{lc200}$ of the second sub-pixel 200 so as to improve color shifting phenomenon in inclined view angles and thus greatly enhance the quality of displaying at large view angles.

For the currently available technique level, it is inevitable that one or more defect main pixels exist in a liquid crystal panel. To improve the yield rate of liquid crystal panels, it is necessary to carry out dark sport repair for those defect main pixels. A conventional dark spot repair method is to cut off the wire of the source terminal and the wire of the drain terminal of the first thin-film transistor T100 and also the wire of the drain terminal of the second thin-film transistor T200 (as indicated by X marks in FIG. 1) and at the same time, the transparent conductive film (Indium tin oxide, ITO) and the common electrode (Com line) of the main pixel are soldered together and shorted (as indicated by bold line in FIG. 10 so as to repair and make the defect main pixel in a normally-dark state to increase the yield rate of the liquid crystal panel. Carrying out dark spot repair on a defective main pixel with this method takes a long time and requires numerous repairing tools thereby leading to reduction of throughput and increase of manufacture cost.

SUMMARY OF THE INVENTION

An object of the present invention is to provide a dark spot repair method of a liquid crystal panel, which achieves dark spot repair by soldering and shorting two upper and lower metal layers of a voltage-division capacitor of a main pixel having a bright spot defect, wherein the method is simple in operation so as to save repairing time, reduce the repairing tools, increase throughput, and lower down manufacture cost.

Another object of the present invention is to provide a liquid crystal panel, which realizes dark spot repair through soldering and shorting two upper and lower metal layers of a voltage-division capacitor of a main pixel having a bright spot defect, of which the operation is simple and efficient so as to increase throughput and lower down manufacture cost.

To achieve the above object, the present invention provides a dark spot repair method of a liquid crystal panel, which comprises the following steps:

(1) providing a liquid crystal panel, wherein the liquid crystal panel comprises a plurality of main pixels and the plurality of main pixels includes main pixels that have bright spot defects and are to be repaired, each of the main pixels being of a charge-share pixel structure, the main pixel comprising first and second voltage-division capacitors, which are connected in series, the first voltage-division capacitor comprising first and second metal layers that are opposite to each other, the second voltage-division capacitor comprising third and fourth metal layers that are opposite to each other; and (2) soldering and connecting together the first metal layer and the second metal layer of the first voltage-division capacitor and soldering and connecting the third metal layer and the fourth metal layer of the second voltage-division capacitor of each of the main pixels that have bright spot defects and are to be repaired so as to form electrical connections thereby shorting each of the first voltage-division capacitor and the second voltage-division capacitor, and repairing and making the main pixels to be repaired in a normally dark state.

Each of main pixels comprises a first sub-pixel and a second sub-pixel adjacent to the first sub-pixel.

The first sub-pixel comprises: a first thin-film transistor, a first liquid crystal capacitor, and a first storage capacitor. The first thin-film transistor comprises a first gate terminal, a first source terminal, and a first drain terminal. The first gate terminal is connected to a first gate line. The first source terminal is connected to a data line. The first drain terminal is electrically connected to an end of the first liquid crystal capacitor and an end of the first storage capacitor. An opposite end of the first liquid crystal capacitor is electrically connected to a first common electrode of a color filter substrate. An opposite end of the first storage capacitor is electrically connected to a second common electrode of a thin-film transistor array substrate.

The second sub-pixel comprises: a second thin-film transistor, a second storage capacitor, a second liquid crystal capacitor, a first voltage-division capacitor, a second voltage-division capacitor, and a third thin-film transistor. The second thin-film transistor comprises a second gate terminal, a second source terminal, and a second drain terminal. The third thin-film transistor comprises a third drain terminal, a third source terminal, and a third gate terminal. The second gate terminal is electrically connected to the first gate line. The second source terminal is electrically connected to the data line. The second drain terminal is electrically connected to an end of the second liquid crystal capacitor, the third source terminal of the third thin-film transistor, and an end of the second storage capacitor. An opposite end of the second liquid crystal capacitor is electrically connected to the first common electrode of the color filter substrate. An opposite end of the second storage capacitor is electrically connected to the second common electrode of the thin-film transistor array substrate. The third drain terminal is electrically connected to an end of the first voltage-division capacitor and an end of the second voltage-division capacitor. The third source terminal is electrically connected to the second drain terminal, an end of the second liquid crystal capacitor, and an end of the second storage capacitor. The third gate terminal is electrically connected to the second gate line. An opposite end of the first voltage-division capacitor is electrically connected to the first drain terminal, an end of the first liquid crystal capacitor, and an end of the first storage capacitor. An opposite end of the second voltage-division capacitor is electrically connected to the second common electrode of the thin-film transistor array substrate.

The plurality of main pixels is arranged in a rectangular array.

The present invention also provides a dark spot repair method of a liquid crystal panel, which comprises the following steps:

(1) providing a liquid crystal panel, wherein the liquid crystal panel comprises a plurality of main pixels and the plurality of main pixels includes main pixels that have bright spot defects and are to be repaired, each of the main pixels being of a charge-share pixel structure, the main pixel comprising first and second voltage-division capacitors, which are connected in series, the first voltage-division capacitor comprising first and second metal layers that are opposite to each other, the second voltage-division capacitor comprising third and fourth metal layers that are opposite to each other; and (2) soldering and connecting together the first metal layer and the second metal layer of the first voltage-division capacitor and soldering and connecting the third metal layer and the fourth metal layer of the second voltage-division capacitor of each of the main pixels that have bright spot defects and are to be repaired so as to form electrical connections thereby shorting each of the first voltage-division capacitor and the second voltage-division capacitor, and repairing and making the main pixels to be repaired in a normally dark state; and wherein each of main pixels comprises a first sub-pixel and a second sub-pixel adjacent to the first sub-pixel;

wherein the first sub-pixel comprises: a first thin-film transistor, a first liquid crystal capacitor, and a first storage capacitor, the first thin-film transistor comprising a first gate terminal, a first source terminal, and a first drain terminal, the first gate terminal being connected to a first gate line, the first source terminal being connected to a data line, the first drain terminal being electrically connected to an end of the first liquid crystal capacitor and an end of the first storage capacitor, an opposite end of the first liquid crystal capacitor being electrically connected to a first common electrode of a color filter substrate, an opposite end of the first storage capacitor being electrically connected to a second common electrode of a thin-film transistor array substrate;

wherein the second sub-pixel comprises: a second thin-film transistor, a second storage capacitor, a second liquid crystal capacitor, a first voltage-division capacitor, a second voltage-division capacitor, and a third thin-film transistor, the second thin-film transistor comprising a second gate terminal, a second source terminal, and a second drain terminal, the third thin-film transistor comprising a third drain terminal, a third source terminal, and a third gate terminal, the second gate terminal being electrically connected to the first gate line, the second source terminal being electrically connected to the data line, the second drain terminal being electrically connected to an end of the second liquid crystal capacitor, the third source terminal of the third thin-film transistor, and an end of the second storage capacitor, an opposite end of the second liquid crystal capacitor being electrically connected to the first common electrode of the color filter substrate, an opposite end of the second storage capacitor being electrically connected to the second common electrode of the thin-film transistor array substrate, the third drain terminal being electrically connected to an end of the first voltage-division capacitor and an end of the second voltage-division capacitor, the third source terminal being electrically connected to the second drain terminal, an end of the second liquid crystal capacitor, and an end of the second storage capacitor, the third gate terminal being electrically connected to the second gate line, an opposite end of the first voltage-division capacitor being electrically connected to the first drain terminal, an end of the first liquid crystal capacitor, and an end of the first storage capacitor, an opposite end of the second voltage-division capacitor being electrically connected to the second common electrode of the thin-film transistor array substrate; and wherein the plurality of main pixels is arranged in a rectangular array.

The present invention further provides a liquid crystal panel, which comprises a plurality of main pixels. The plurality of main pixels includes main pixels that have bright spot defects and are to be repaired. Each of the main pixels is of a charge-share pixel structure. The main pixel comprises first and second voltage-division capacitors, which are connected in series. The first voltage-division capacitor comprises first and second metal layers that are opposite to each other. The second voltage-division capacitor comprises third and fourth metal layers that are opposite to each other. The first metal layer and the second metal layer of the first voltage-division capacitor of the main pixels to be repaired are electrically connected. The third metal layer and the fourth metal layer of the second voltage-division capacitor of the main pixels to be repaired are electrically connected together.

Each of main pixels comprises a first sub-pixel and a second sub-pixel adjacent to the first sub-pixel.

The first sub-pixel comprises: a first thin-film transistor, a first liquid crystal capacitor, and a first storage capacitor. The first thin-film transistor comprises a first gate terminal, a first source terminal, and a first drain terminal. The first gate terminal is connected to a first gate line. The first source terminal is connected to a data line. The first drain terminal is electrically connected to an end of the first liquid crystal capacitor and an end of the first storage capacitor. An opposite end of the first liquid crystal capacitor is electrically connected to a first common electrode of a color filter substrate. An opposite end of the first storage capacitor is electrically connected to a second common electrode of a thin-film transistor array substrate.

The second sub-pixel comprises: a second thin-film transistor, a second storage capacitor, a second liquid crystal capacitor, a first voltage-division capacitor, a second voltage-division capacitor, and a third thin-film transistor. The second thin-film transistor comprises a second gate terminal, a second source terminal, and a second drain terminal. The third thin-film transistor comprises a third drain terminal, a third source terminal, and a third gate terminal. The second gate terminal is electrically connected to the first gate line. The second source terminal is electrically connected to the data line. The second drain terminal is electrically connected to an end of the second liquid crystal capacitor, the third source terminal of the third thin-film transistor, and an end of the second storage capacitor. An opposite end of the second liquid crystal capacitor is electrically connected to the first common electrode of the color filter substrate. An opposite end of the second storage capacitor is electrically connected to the second common electrode of the thin-film transistor array substrate. The third drain terminal is electrically connected to an end of the first voltage-division capacitor and an end of the second voltage-division capacitor. The third source terminal is electrically connected to the second drain terminal, an end of the second liquid crystal capacitor, and an end of the second storage capacitor. The third gate terminal is electrically connected to the second gate line. An opposite end of the first voltage-division capacitor is electrically connected to the first drain terminal, an end of the first liquid crystal capacitor, and an end of the first storage capacitor. An opposite end of the second voltage-division capacitor is electrically connected to the second common electrode of the thin-film transistor array substrate.

The plurality of main pixels is arranged in a rectangular array.

The efficacy of the present invention is that the present invention provides a dark spot repair method of a liquid crystal panel, which connects together, through soldering, upper and lower metal layers of each of first and second voltage-division capacitors of a charge-share pixel structure of a liquid crystal panel that has a bright spot defect and is to be repaired so as to provide an effect of electrical connection thereby shorting the first and second voltage-division capacitors to achieve the effect of dark spot repair. The method is simple is operation so as to save repair time, reduce repairing tools, increase throughput, and lower down manufacture cost. The present invention provides a liquid crystal panel, in which dark spot repair is achieved through soldering and shorting upper and lower metal layers of a voltage-division capacitor of a main pixel that has a bright spot defect and is to be repaired. The operation is simple and efficient and can increase throughput and lower down manufacture cost.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing:

FIG. 2 is a flow chart illustrating a dark spot repair method of a liquid crystal panel according to the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
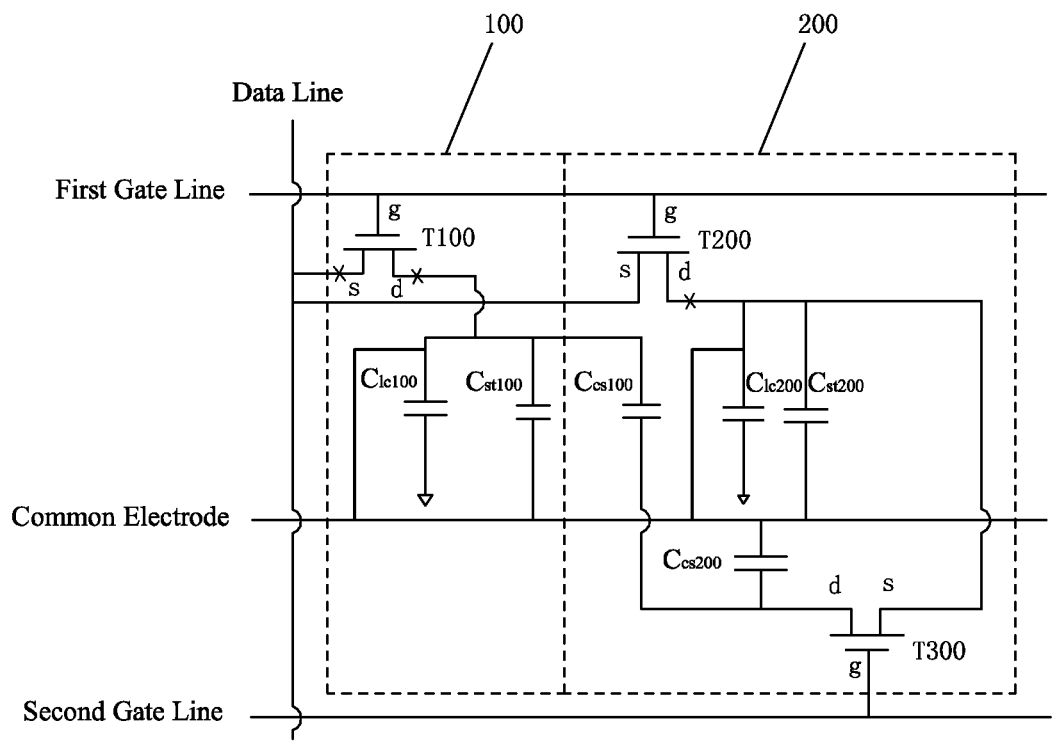
FIG. 1 is a schematic circuit diagram illustrating a conventional dark spot repair method of a liquid crystal panel.
Figure 3:
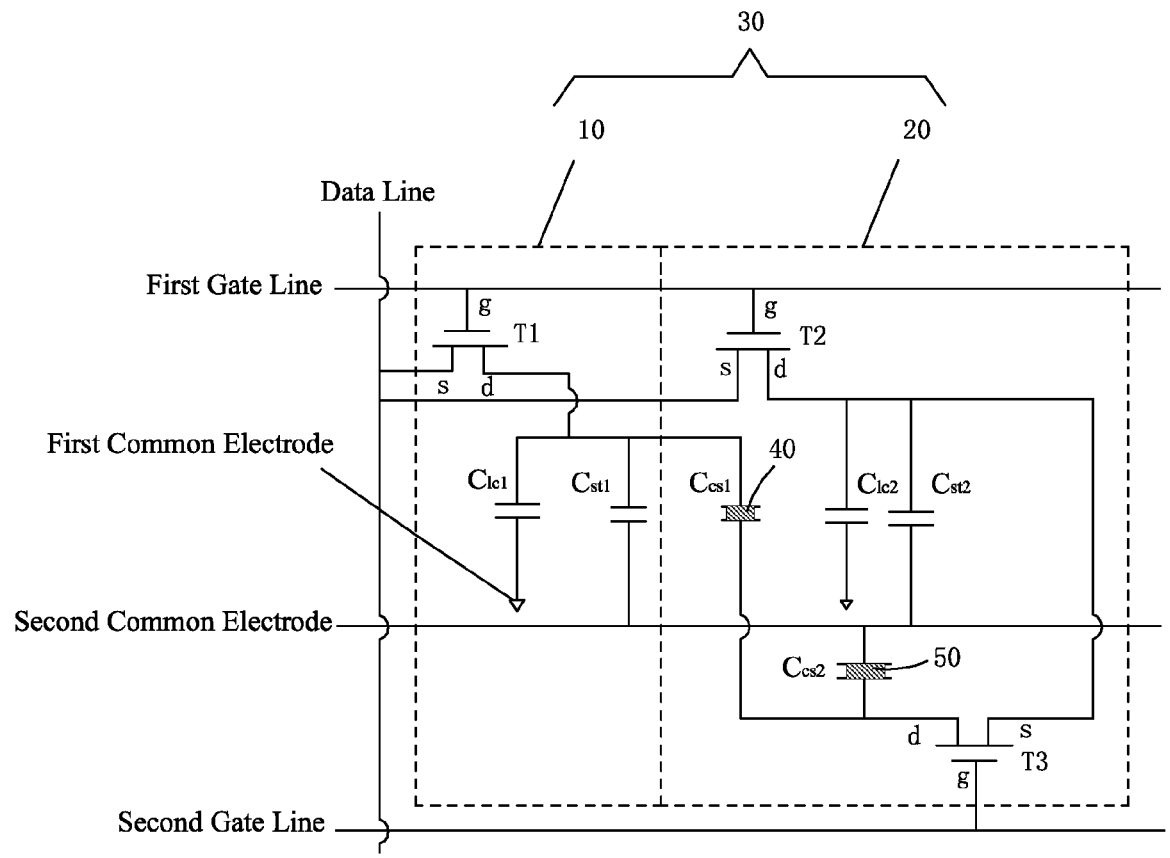
FIG. 3 is a schematic circuit diagram illustrating the dark spot repair method of a liquid crystal panel according to the present invention.

Referring to FIGS. 2 and 3, the present invention provides a dark spot repair method of a liquid crystal panel, which comprises the following steps:

Step 1: providing a liquid crystal panel, wherein the liquid crystal panel comprises a plurality of main pixels 30 and the plurality of main pixels 30 includes main pixels 30 that have bright spot defects and are to be repaired, each of the main pixels 30 being of a charge-share pixel structure, the main pixel 30 comprising first and second voltage-division capacitors $C_{cs1}$, $C_{cs2}$, which are connected in series, the first voltage-division capacitor $C_{cs1}$ comprising first and second metal layers that are opposite to each other, the second voltage-division capacitor $C_{cs2}$ comprising third and fourth metal layers that are opposite to each other.

In the instant embodiment, the plurality of main pixels 30 is arranged in a rectangular array. Each of the main pixels 30 comprises: a first sub-pixel 10 and a second sub-pixel 20 adjacent to the first sub-pixel 10. The first sub-pixel 10 comprises: a first thin-film transistor T1, a first liquid crystal capacitor $C_{lc1}$, and a first storage capacitor $C_{st1}$. The first thin-film transistor T1 comprises a first gate terminal g, a first source terminal s, and a first drain terminal d. The first gate terminal g is connected to a first gate line. The first source terminal s is connected to a data line. The first drain terminal d is electrically connected to an end of the first liquid crystal capacitor $C_{lc1}$ and an end of the first storage capacitor $C_{st1}$. An opposite end of the first liquid crystal capacitor $C_{lc1}$ is electrically connected to a first common electrode of a color filter substrate. An opposite end of the first storage capacitor $C_{st1}$ is electrically connected to a second common electrode of a thin-film transistor array substrate. The second sub-pixel 20 comprises: a second thin-film transistor T2, a second storage capacitor $C_{st2}$, a second liquid crystal capacitor $C_{lc2}$, a first voltage-division capacitor $C_{cs1}$, a second voltage-division capacitor $C_{cs2}$, and a third thin-film transistor T3. The second thin-film transistor T2 comprises a second gate terminal g, a second source terminal s, and a second drain terminal d. The third thin-film transistor T3 comprises a third drain terminal d, a third source terminal s, and a third gate terminal g. The second gate terminal g is electrically connected to the first gate line. The second source terminal s is electrically connected to the data line. The second drain terminal d is electrically connected to an end of the second liquid crystal capacitor $C_{lc2}$, the third source terminal s of the third thin-film transistor T3, and an end of the second storage capacitor $C_{st2}$. An opposite end of the second liquid crystal capacitor $C_{lc2}$ is electrically connected to the first common electrode of the color filter substrate. An opposite end of the second storage capacitor $C_{st2}$ is electrically connected to the second common electrode of the thin-film transistor array substrate. The third drain terminal d is electrically connected to an end of the first voltage-division capacitor $C_{cs1}$ and an end of the second voltage-division capacitor $C_{cs2}$. The third source terminal s is electrically connected to the second drain terminal d, an end of the second liquid crystal capacitor $C_{lc2}$, and an end of the second storage capacitor $C_{st2}$. The third gate terminal g is electrically connected to the second gate line. An opposite end of the first voltage-division capacitor $C_{cs1}$ is electrically connected to the first drain terminal d, an end of the first liquid crystal capacitor $C_{lc1}$, and an end of the first storage capacitor $C_{st1}$. An opposite end of the second voltage-division capacitor $C_{cs2}$ is electrically connected to the second common electrode of the thin-film transistor array substrate.

Step 2: soldering and connecting together the first metal layer and the second metal layer of the first voltage-division capacitor $C_{cs1}$ and soldering and connecting the third metal layer and the fourth metal layer of the second voltage-division capacitor $C_{cs2}$ of each of the main pixels 30 that have bright spot defects and are to be repaired (as respectively indicated at 40, 50 in FIG. 3) so as to form electrical connections thereby shorting each of the first voltage-division capacitor $C_{cs1}$ and the second voltage-division capacitor $C_{cs2}$, and repairing and making the main pixels 30 to be repaired in a normally dark state.

Before the dark spot repair is applied to the main pixels 30 that have bright spot defects and are to be repaired, a high voltage level is applied the first gate line and a low voltage level is applied to the second gate line, so that the first and second thin-film transistors T1, T2 are turned on and the third thin-film transistor T3 is turned off to have the first and second sub-pixels 10, simultaneously charged and have charges accumulated on the first and second storage capacitor $C_{st1}$, $C_{st2}$ to maintain the remaining images of a frame.

After the dark spot repair of the above described Step 2 has been applied to the main pixels 30 that have bright spot defects and are to be repaired, a high voltage level is applied to the first gate line and a low voltage level is applied to the second gate line, so that the first and second thin-film transistors T1, T2 are turned on and the third thin-film transistor T3 is turned off. The first sub-pixel 10 and the second sub-pixel 20 are charged simultaneously. Due to the soldering applied at 40, 50 of FIG. 3 (namely the first and second voltage-division capacitors $C_{cs1}$, $C_{cs2}$), the first sub-pixel 10 is shorted. However, since the third thin-film transistor T3 is turned off, the second sub-pixel 20 operates normally to give off light. Further, since the conduction time of the first thin-film transistor T1 and the second thin-film transistor T2 is only 1/60 seconds and the cut-off time is 59/60 second (the scanning frequency being 60 Hz), before human eyes are capable of to respond, the output voltage of the first gate line has already been converted into a low voltage level, the output voltage level of the second gate line becomes a high voltage level, and the third thin-film transistor T3 is conducted on to discharge the charges accumulated on the second storage capacitor $C_{st2}$ to the second common electrode of the thin-film transistor array substrate, so that the human eyes constantly perceive that the main pixels 30 that are repaired are consistently dark.

For the charge-share pixels structure of a liquid crystal panel that have bright spot defects and are to be repaired, the present invention applies soldering to and thus connecting together the two upper and lower metal layers of each of the first and second voltage-division capacitors $C_{cs1}$, $C_{cs2}$ to provide an effect of electrical connection to thereby short the first and second voltage-division capacitors $C_{cs1}$, $C_{cs2}$ and achieve an effect of dark spot repair. The method is simple in operation so as to save repair time, reduce repairing tools, increase throughput, and lower down manufacture cost.

Referring to FIG. 3, the present invention also provides a liquid crystal panel, which comprises a plurality of main pixels 30 and the plurality of main pixels 30 includes main pixels 30 that have bright spot defects and are to be repaired, each of the main pixels 30 being of a charge-share pixel structure, the main pixel 30 comprising first and second voltage-division capacitors $C_{cs1}$, $C_{cs2}$, which are connected in series, the first voltage-division capacitor $C_{cs1}$ comprising first and second metal layers that are opposite to each other, the second voltage-division capacitor $C_{cs2}$ comprising third and fourth metal layers that are opposite to each other. The first metal layer and the second metal layer of the first voltage-division capacitor $C_{cs1}$ of the main pixels 30 to be repaired are electrically connected and the third metal layer and the fourth metal layer of the second voltage-division capacitor $C_{cs2}$ of the main pixels 30 to be repaired are electrically connected together.

In the instant embodiment, the plurality of main pixels 30 is arranged in a rectangular array. Each of the main pixels 30 comprises: a first sub-pixel 10 and a second sub-pixel 20 adjacent to the first sub-pixel 10. The first sub-pixel 10 comprises: a first thin-film transistor T1, a first liquid crystal capacitor $C_{lc1}$, and a first storage capacitor $C_{st1}$. The first thin-film transistor T1 comprises a first gate terminal g, a first source terminal s, and a first drain terminal d. The first gate terminal g is connected to a first gate line. The first source terminal s is connected to a data line. The first drain terminal d is electrically connected to an end of the first liquid crystal capacitor $C_{lc1}$ and an end of the first storage capacitor $C_{st1}$. An opposite end of the first liquid crystal capacitor $C_{lc1}$ is electrically connected to a first common electrode of a color filter substrate. An opposite end of the first storage capacitor $C_{st1}$ is electrically connected to a second common electrode of a thin-film transistor array substrate. The second sub-pixel 20 comprises: a second thin-film transistor T2, a second storage capacitor $C_{st2}$, a second liquid crystal capacitor $C_{lc2}$, a first voltage-division capacitor $C_{cs1}$, a second voltage-division capacitor $C_{cs2}$, and a third thin-film transistor T3. The second thin-film transistor T2 comprises a second gate terminal g, a second source terminal s, and a second drain terminal d. The third thin-film transistor T3 comprises a third drain terminal d, a third source terminal s, and a third gate terminal g. The second gate terminal g is electrically connected to the first gate line. The second source terminal s is electrically connected to the data line. The second drain terminal d is electrically connected to an end of the second liquid crystal capacitor $C_{lc2}$, the third source terminal s of the third thin-film transistor T3, and an end of the second storage capacitor $C_{st2}$. An opposite end of the second liquid crystal capacitor $C_{lc2}$ is electrically connected to the first common electrode of the color filter substrate. An opposite end of the second storage capacitor $C_{st2}$ is electrically connected to the second common electrode of the thin-film transistor array substrate. The third drain terminal d is electrically connected to an end of the first voltage-division capacitor $C_{cs1}$ and an end of the second voltage-division capacitor $C_{cs2}$. The third source terminal s is electrically connected to the second drain terminal d, an end of the second liquid crystal capacitor $C_{lc2}$, and an end of the second storage capacitor $C_{st2}$. The third gate terminal g is electrically connected to the second gate line. An opposite end of the first voltage-division capacitor $C_{cs1}$ is electrically connected to the first drain terminal d, an end of the first liquid crystal capacitor $C_{lc1}$, and an end of the first storage capacitor $C_{st1}$. An opposite end of the second voltage-division capacitor $C_{cs2}$ is electrically connected to the second common electrode of the thin-film transistor array substrate.

The first metal layer is connected to the second metal layer by means of soldering so as to form electrical connection; the third metal layer is connected to the fourth metal layer by means of soldering so as to form electrical connection, the operation being easy and being advantages for increasing manufacture efficiency and lower down manufacture cost.

Before the dark spot repair is applied to the main pixels 30 that have bright spot defects and are to be repaired, a high voltage level is applied the first gate line and a low voltage level is applied to the second gate line, so that the first and second thin-film transistors T1, T2 are turned on and the third thin-film transistor T3 is turned off to have the first and second sub-pixels 10, simultaneously charged and have charges accumulated on the first and second storage capacitor $C_{st1}$, $C_{st2}$ to maintain the remaining images of a frame.

After the dark spot repair has been applied to the main pixels 30 that have bright spot defects and are to be repaired (namely the first metal layer and the second metal layer of the first voltage-division capacitor $C_{cs1}$ of the main pixel to be repaired are electrically connected and the third metal layer and the fourth metal layer of the second voltage-division capacitor $C_{cs2}$ of the main pixel to be repaired are electrically connected), a high voltage level is applied to the first gate line and a low voltage level is applied to the second gate line, so that the first and second thin-film transistors T1, T2 are turned on and the third thin-film transistor T3 is turned off. The first sub-pixel 10 and the second sub-pixel 20 are charged simultaneously. Due to the soldering applied at 40, 50 of FIG. 3 (namely the first and second voltage-division capacitors $C_{cs1}$, $C_{cs2}$), the first sub-pixel 10 is shorted. However, since the third thin-film transistor T3 is turned off, the second sub-pixel 20 operates normally to give off light. Further, since the conduction time of the first thin-film transistor T1 and the second thin-film transistor T2 is only 1/60 seconds and the cut-off time is 59/60 second (the scanning frequency being 60 Hz), before human eyes are capable of to respond, the output voltage of the first gate line has already been converted into a low voltage level, the output voltage level of the second gate line becomes a high voltage level, and the third thin-film transistor T3 is conducted on to discharge the charges accumulated on the second storage capacitor $C_{st2}$ to the second common electrode of the thin-film transistor array substrate, so that the human eyes constantly perceive that the main pixels 30 that are repaired are consistently dark.

In summary, the present invention provides a dark spot repair method of a liquid crystal panel, which connects together, through soldering, upper and lower metal layers of each of first and second voltage-division capacitors of a charge-share pixel structure of a liquid crystal panel that has a bright spot defect and is to be repaired so as to provide an effect of electrical connection thereby shorting the first and second voltage-division capacitors to achieve the effect of dark spot repair. The method is simple is operation so as to save repair time, reduce repairing tools, increase throughput, and lower down manufacture cost. The present invention also provides a liquid crystal panel, in which dark spot repair is achieved through soldering and shorting upper and lower metal layers of a voltage-division capacitor of a main pixel that has a bright spot defect and is to be repaired. The operation is simple and efficient and can increase throughput and lower down manufacture cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A dark spot repair method of a liquid crystal panel, comprising the following steps:
    (1) providing a liquid crystal panel, wherein the liquid crystal panel comprises a plurality of main pixels and the plurality of main pixels includes main pixels that have bright spot defects and are to be repaired, each of the main pixels being of a charge-share pixel structure, the main pixel comprising first and second voltage-division capacitors, which are connected in series, the first voltage-division capacitor comprising first and second metal layers that are opposite to each other, the second voltage-division capacitor comprising third and fourth metal layers that are opposite to each other; and
    (2) soldering and connecting together the first metal layer and the second metal layer of the first voltage-division capacitor and soldering and connecting the third metal layer and the fourth metal layer of the second voltage-division capacitor of each of the main pixels that have bright spot defects and are to be repaired so as to form electrical connections thereby shorting each of the first voltage-division capacitor and the second voltage-division capacitor, and repairing and making the main pixels to be repaired in a normally dark state;
    wherein each of main pixels comprises a first sub-pixel and a second sub-pixel adjacent to the first sub-pixel;
    wherein the first sub-pixel comprises: a first thin-film transistor, a first liquid crystal capacitor, and a first storage capacitor, the first thin-film transistor comprising a first gate terminal, a first source terminal, and a first drain terminal, the first gate terminal being connected to a first gate line, the first source terminal being connected to a data line, the first drain terminal being electrically connected to an end of the first liquid crystal capacitor and an end of the first storage capacitor, an opposite end of the first liquid crystal capacitor being electrically connected to a first common electrode of a color filter substrate, an opposite end of the first storage capacitor being electrically connected to a second common electrode of a thin-film transistor array substrate; and
    wherein the second sub-pixel comprises: a second thin-film transistor, a second storage capacitor, a second liquid crystal capacitor, the first voltage-division capacitor, the second voltage-division capacitor, and a third thin-film transistor, the second thin-film transistor comprising a second gate terminal, a second source terminal, and a second drain terminal, the third thin-film transistor comprising a third drain terminal, a third source terminal, and a third gate terminal, the second gate terminal being electrically connected to the first gate line, the second source terminal being electrically connected to the data line, the second drain terminal being electrically connected to an end of the second liquid crystal capacitor, the third source terminal of the third thin-film transistor, and an end of the second storage capacitor, an opposite end of the second liquid crystal capacitor being electrically connected to the first common electrode of the color filter substrate, an opposite end of the second storage capacitor being electrically connected to the second common electrode of the thin-film transistor array substrate, the third drain terminal being electrically connected to an end of the first voltage-division capacitor and an end of the second voltage-division capacitor, the third source terminal being electrically connected to the second drain terminal, an end of the second liquid crystal capacitor, and an end of the second storage capacitor, the third gate terminal being electrically connected to the second gate line, an opposite end of the first voltage-division capacitor being electrically connected to the first drain terminal, an end of the first liquid crystal capacitor, and an end of the first storage capacitor, an opposite end of the second voltage-division capacitor being electrically connected to the second common electrode of the thin-film transistor array substrate.

2. A dark spot repair method of a liquid crystal panel, comprising the following steps:
  (1) providing a liquid crystal panel, wherein the liquid crystal panel comprises a plurality of main pixels and the plurality of main pixels includes main pixels that have bright spot defects and are to be repaired, each of the main pixels being of a charge-share pixel structure, the main pixel comprising first and second voltage-division capacitors, which are connected in series, the first voltage-division capacitor comprising first and second metal layers that are opposite to each other, the second voltage-division capacitor comprising third and fourth metal layers that are opposite to each other; and
  (2) soldering and connecting together the first metal layer and the second metal layer of the first voltage-division capacitor and soldering and connecting the third metal layer and the fourth metal layer of the second voltage-division capacitor of each of the main pixels that have bright spot defects and are to be repaired so as to form electrical connections thereby shorting each of the first voltage-division capacitor and the second voltage-division capacitor, and repairing and making the main pixels to be repaired in a normally dark state; and
  wherein each of main pixels comprises a first sub-pixel and a second sub-pixel adjacent to the first sub-pixel;
  wherein the first sub-pixel comprises: a first thin-film transistor, a first liquid crystal capacitor, and a first storage capacitor, the first thin-film transistor comprising a first gate terminal, a first source terminal, and a first drain terminal, the first gate terminal being connected to a first gate line, the first source terminal being connected to a data line, the first drain terminal being electrically connected to an end of the first liquid crystal capacitor and an end of the first storage capacitor, an opposite end of the first liquid crystal capacitor being electrically connected to a first common electrode of a color filter substrate, an opposite end of the first storage capacitor being electrically connected to a second common electrode of a thin-film transistor array substrate;
  wherein the second sub-pixel comprises: a second thin-film transistor, a second storage capacitor, a second liquid crystal capacitor, the first voltage-division capacitor, the second voltage-division capacitor, and a third thin-film transistor, the second thin-film transistor comprising a second gate terminal, a second source terminal, and a second drain terminal, the third thin-film transistor comprising a third drain terminal, a third source terminal, and a third gate terminal, the second gate terminal being electrically connected to the first gate line, the second source terminal being electrically connected to the data line, the second drain terminal being electrically connected to an end of the second liquid crystal capacitor, the third source terminal of the third thin-film transistor, and an end of the second storage capacitor, an opposite end of the second liquid crystal capacitor being electrically connected to the first common electrode of the color filter substrate, an opposite end of the second storage capacitor being electrically connected to the second common electrode of the thin-film transistor array substrate, the third drain terminal being electrically connected to an end of the first voltage-division capacitor and an end of the second voltage-division capacitor, the third source terminal being electrically connected to the second drain terminal, an end of the second liquid crystal capacitor, and an end of the second storage capacitor, the third gate terminal being electrically connected to the second gate line, an opposite end of the first voltage-division capacitor being electrically connected to the first drain terminal, an end of the first liquid crystal capacitor, and an end of the first storage capacitor, an opposite end of the second voltage-division capacitor being electrically connected to the second common electrode of the thin-film transistor array substrate; and
  wherein the plurality of main pixels is arranged in a rectangular array.

* * * * *